United States Patent
Mas Rosique et al.

(10) Patent No.: US 12,500,860 B2
(45) Date of Patent: Dec. 16, 2025

(54) APPLICATION TRIGGERED SETUP OF DISTRIBUTED ANCHOR FOR EDGE COMPUTING

(71) Applicant: TELEFONAKTIEBOLAGET LM ERICSSON (PUBL), Stockholm (SE)

(72) Inventors: Maria Luisa Mas Rosique, Tres Cantos (ES); Attila Mihály, Dunakeszi (HU); Magnus Hallenstål, Täby (SE); Magnus Olsson, London (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/329,864

(22) Filed: Jun. 6, 2023

(65) Prior Publication Data
US 2024/0073178 A1 Feb. 29, 2024

Related U.S. Application Data

(63) Continuation of application No. 17/802,427, filed as application No. PCT/IB2021/051867 on Mar. 5, 2021, now Pat. No. 11,716,308.

(60) Provisional application No. 62/985,531, filed on Mar. 5, 2020.

(51) Int. Cl.
*H04L 41/5003* (2022.01)
*H04L 61/4511* (2022.01)
*H04W 48/00* (2009.01)

(52) U.S. Cl.
CPC ...... *H04L 61/4511* (2022.05); *H04L 41/5003* (2013.01); *H04W 48/17* (2013.01)

(58) Field of Classification Search
CPC ............ H04L 61/4511; H04L 61/5006; H04L 61/5012; H04L 61/5019; H04L 61/5027; H04L 61/5029

(Continued)

(56) References Cited

U.S. PATENT DOCUMENTS

2006/0036767 A1* 2/2006 Ryan .................. H04L 61/3025
709/245
2018/0227743 A1 8/2018 Faccin et al.
(Continued)

FOREIGN PATENT DOCUMENTS

EP 3592059 A1 1/2020
EP 4072101 A1 * 10/2022 .......... H04L 61/4511
(Continued)

OTHER PUBLICATIONS

3GPP TS 23.501 V16.2.0 (Sep. 2019), "3rd Generation Partnership Project; Technical Specification Group Services and System Aspects; System Architecture for the 5G System (5GS); Stage 2 (Release 16)," Sep. 2019; p. 1 and 2.

(Continued)

*Primary Examiner* — Khanh Q Dinh
(74) *Attorney, Agent, or Firm* — Ericsson Inc.

(57) ABSTRACT

Embodiments describing methods performed by a system comprising Network functions including at least a Session Management Function and a User Plane Function for performing a UPF re-anchoring for an application triggered at a User Equipment over an established Packet Data Unit (PDU) Session, where when the system receives the initial trigger for a service triggered by the application (e.g., a DNS request or an application level request), a determination is made by the system based on the information related to the application that re-anchoring of the UPF for that application into a local UPF closer to the UE is required. When re-anchoring of the UPF is successful, the initial trigger is discarded, and the UE is instructed to establish a new PDU session over the local UPF for that application.

15 Claims, 16 Drawing Sheets

(58) Field of Classification Search
USPC .......................................... 709/220, 224–228
See application file for complete search history.

(56) References Cited

U.S. PATENT DOCUMENTS

| | | | | |
|---|---|---|---|---|
| 2018/0324137 | A1* | 11/2018 | Tuliani | ............... H04L 61/4511 |
| 2019/0149365 | A1 | 5/2019 | Chatterjee et al. | |
| 2019/0174449 | A1 | 6/2019 | Shan | |
| 2019/0174466 | A1 | 6/2019 | Zhang | |
| 2019/0281588 | A1 | 9/2019 | Zhang | |
| 2020/0100303 | A1* | 3/2020 | Sankar | ............... H04W 76/11 |
| 2020/0127963 | A1* | 4/2020 | Kapoor | ............... H04L 67/02 |
| 2021/0029075 | A1 | 1/2021 | Yu | |
| 2021/0226914 | A1* | 7/2021 | Shan | ............... H04L 61/4552 |
| 2022/0086218 | A1 | 3/2022 | Sabella | |
| 2022/0118631 | A1 | 4/2022 | Chou | |
| 2022/0174032 | A1* | 6/2022 | Zhu | ............... H04L 45/121 |
| 2024/0056415 | A1* | 2/2024 | Tang | ............... H04L 61/4511 |
| 2024/0196178 | A1* | 6/2024 | Ying | ............... H04W 8/18 |
| 2024/0204931 | A1* | 6/2024 | Xiong | ............... H04L 5/0053 |
| 2024/0205781 | A1* | 6/2024 | Li | ............... H04W 36/0058 |
| 2024/0235772 | A1* | 7/2024 | Wang | ............... H04L 5/001 |
| 2024/0298194 | A1* | 9/2024 | Mueck | ............... G06N 20/00 |

FOREIGN PATENT DOCUMENTS

| | | | | |
|---|---|---|---|---|
| EP | 4322497 | A1 * | 2/2024 | ......... H04L 61/4511 |
| WO | 2018177656 | A1 | 10/2018 | |
| WO | 2018236830 | A1 | 12/2018 | |

OTHER PUBLICATIONS

3GPP TS 29.514 V16.2.0, 3rd Generation Partnership Project; Technical Specification Group Core Network and Terminals; 5G System; Policy Authorization Service ;Stage 3 (Release 16) Sep. 2019; 127 pages.

3rd Generation Partnership Project; Technical Specification Group Services and System Aspects; Study on enhancement of support for Edge Computing in 5G Core network (5GC) (Release 17), 3GPP TR 23.748 V0.3.0; Jan. 2020; 40 pages.

C. Contavalli et al., "Client Subnet in DNS Queries", Internet Engineering Task Force (IETF), ISSN: 2070-1721, May 2016, 30 pages.

Ericsson, "KI #1, Sol #12: Updates to the solution" 3GPP TSG-SA/WG2 Meeting No. 141E-S2-2007856 (was 7128r07), Oct. 12-23, 2020, Electronic meeting, 10 pages.

Ericsson, "KI#2, New sol: Service Continuity at Edge Relocation with DNS triggered insertion of BP/ULCL and Edge PSA", 3GPP TSG-SA/WG2 Meeting No. 140E-S2-2004954, Aug. 19-Sep. 2, 2020, Electronic meeting, 7 pages.

Huawei, Hisilicon, Discovery of Edge Application Server based on AF Influence in Support of Edge Relocation, 3GPP TSG-SA WG2 Meeting No. 136-AH-S2-2000653, Jan. 13-Jan. 17, 2020, Incheon, South Korean, 4 pages.

ZTE, "KI#5 Sol#12 and Sol#50 update", 3GPP TSG-SA/WG2 Meeting No. 141e-S2-2007364, Oct. 12-23, 2020, Elbonia, Electronic meeting, 9 pages.

3GPP, 3rd Generation Partnership Project; Technical Specification Group Services and System Aspects; Study on enhancement of support for Edge Computing in 5G Core network (5GC) (Release 17); TR 23.748 V1.2.0 (Nov. 2020).

Huawei, HiSilicon, CAICT, "Solution for the KI#1—Discovery of EAS based on DNS Mechanism", SA WG2 Meeting #136AH, Incheon, South Korea, Jan. 13-17, 2020, S2-2001457.

Motorola Mobility, Lenovo, "Solution for Discovery of Edge Application Server", 3GPP TSG-SA2, Meeting #136AH, Jan. 13-17, 2020, Incheon, Korea, S2-2000522.

Nokia, Nokia Shanghai Bell, "Ethernet LAN Mobility", SA WG2 Meeting #128-Bis, Aug. 20-24, 2018, Sophia, Antipolis, S2-1810439.

* cited by examiner

APPLICATION TRIGGERED SETUP OF DISTRIBUTED ANCHOR FOR EDGE COMPUTING

RELATED APPLICATIONS

This application is a continuation of patent application Ser. No. 17/802,427, filed on Aug. 25, 2022 which is a 35 U.S.C. § 371 national phase filing of International Application No. PCT/IB2021/051867, filed on Mar. 5, 2021, which claims the benefit of provisional patent application Ser. No. 62/985,531, filed on Mar. 5, 2020, the disclosure of which is hereby incorporated herein by reference in its entirety.

TECHNICAL FIELD

The present disclosure relates generally to Edge computing, and more particularly, to User plane function (UPF) re-anchoring in support of edge computing applications.

BACKGROUND

Edge Computing is a network architecture concept that enables cloud computing capabilities and service environments to be deployed at the edge of the cellular network. It promises several benefits such as lower latency, higher bandwidth, reduced backhaul traffic and prospects for several new services.

Domain Name System (DNS)

The Domain Name System (DNS) is a hierarchical and decentralized naming system for computers, services, or other resources connected to the Internet or a private network. It associates various information with domain names assigned to each of the participating entities. Most prominently, it translates more readily memorized domain names to the numerical IP addresses needed for locating and identifying computer services and devices with the underlying network protocols.

The Domain Name System has been defined by IETF and specifies the technical functionality of the database service that is at its core. It defines the DNS protocol, a detailed specification of the data structures and data communication exchanges used in the DNS, as part of the Internet Protocol Suite.

The Internet maintains two principal namespaces, the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain; a DNS name server responds with answers to queries against its database.

DNS today can return different responses based on the perceived topological location of the user. These servers use the IP address of the incoming query to identify that location. Since most queries come from Intermediate Recursive Resolvers, the source address is that of the Recursive Resolver rather than of the query originator. Traditionally, and probably still in the majority of instances, recursive Resolvers are reasonably close in the topological sense to the query originator. For these resolvers, using their own IP address is sufficient for Authoritative Nameservers that tailor responses based upon location of the querier.

To address the case of Recursive Resolvers that are not topologically close to the query originator IETF has defined RFC 7871 which defines an EDNSO (that is, a DNS extension according to RFC6891) option to convey network information that is relevant to the DNS message. It can carry sufficient network information about the originator (in form of a client IP subnet) for the Authoritative Nameserver to tailor responses. It also provides for the Authoritative Nameserver to indicate the scope of network addresses for which the tailored answer is intended.

Edge Computing in 3GPP

The next generation (5G) networks architecture is defined in 3GPP Rel. 16. FIG. 1 (PRIOR ART) depicts the 5G reference architecture as defined by 3GPP TS 23. 501.

In the scope of this application, it is worth to highlight, the role of the Network Functions as illustrated in FIG. 1 (prior art):

SMF (Session Management Function), that is responsible for Session establishment, modification and release, including selection and control of the UPF entities, maintaining the topology of the involved PSA UPFs, establishing and releasing the tunnel between AN and UPF and between UPFs. It also configures traffic forwarding at UPF. SMF interacts with the UPF over N4 Reference point using PFCP procedures.

UPF (User Plane Function), that handles the user data traffic. Among other, it provides the external PDU Session point of interconnect to Data Network (PDU session anchor) and performs packet routing & forwarding (e.g. support of Uplink classifier (UL CL) to route traffic flows to an instance of a data network, support of Branching point to support multi-homed PDU Session).

A Network Function (NF), which can be an SMF, UPF, AF, etc. can be implemented either as a network element on a dedicated hardware, as a software instance running on a dedicated hardware, or as a virtualized function instantiated on an appropriate platform, e.g., on a cloud infrastructure. An NF on the control plane of the 5G Service based architecture may be an NF service consumer or NF service producer.

Each NF as sown in FIG. 2 (PRIOR ART) is self-contained and offer different services to distinct NF consumers. Each of the NF services offered by a Network Function is self-contained (e.g., cloud native microservices), reusable and use management schemes independently of other NF services offered by the same Network Function (e.g. for scaling, healing, etc).

Each NF service provided by an NF shall be accessible by means of standardized Application Protocol interface (API) specified by 3GPP in 3GPP TS 29.5xx series.

Each NF is deployed as one or more NF instance or as an NF instance set, i.e., a group of interchangeable NF instances of the same type, supporting the same services and the same Network Slice(s). The NF instances in the same NF Set may be stateless and geographically distributed providing the services from several locations and several execution instances in each location. Each NF instance can have multiple instances of the same service, NF service set, i.e., a group of interchangeable NF service instances of the same service type within an NF instance. See FIGS. 3a, b and c (PRIOR ART).

NF/service instances within a single Set have access to common session context/database. Note that although the above description of the NF seems to be applied to control plane NFs in the 5G SBA, it may be possible that the UPF which is part of the user plane in the 5G SBA, be enhanced to also support SBA principles.

As stated in 3GPP TS 23.501 clause 5.13, Edge computing enables operator and 3rd party services to be hosted close to the UE's access point of attachment, so as to achieve an efficient service delivery through the reduced end-to-end latency and load on the transport network. The 5G Core Network selects a UPF close to the UE and executes the traffic steering from the UPF to the local Data Network via the N6 interface to the external data network.

A number of enablers have been defined that alone or in combination support Edge Computing (clause 5.13. in 3GPP TS 23.501), including:

User plane (re)selection: the 5G Core Network (re)selects UPF to route the user traffic to the local Data Network as described in clause 6.3.3 of TS 23.501;

Local Routing and Traffic Steering: the 5G Core Network selects the traffic to be routed to the applications in the local Data Network;

this includes the use of a single PDU Session with multiple PDU Session Anchor(s) (UL CL/IP v6 multi-homing) as described in clause 5.6.4.

At least three connectivity models have been found relevant for Edge computing. They are captured in 3GPP Technical Report TR 23.748 clause 4.2 illustrated in FIG. 4 (prior art), including:

distributed Anchor Point: the PDU Session anchor (PSA) is moved far out in the network, to the local sites. It is the same for all the user PDU session traffic. Re-anchoring (Session Service Continuity #2, SSC #2, and SSC #3) is used to optimize traffic routing for all applications when moving long distances. Description of the SSC modes 1, 2 and 3 is found in clause 5.6.9 of TS 23.501.

Session Breakout: The PDU session has a PDU Session anchor in a central site and a PDU Session anchor in the local site. Only one of them provides the IP anchor point. The Edge Computing application traffic is selectively diverted to the local PDU Session anchor using UL Classifier or multihoming BP technology. Re-anchoring of the local PDU Session anchor is used to optimize traffic routing for locally diverted traffic as the user moves.

Multiple PDU sessions: Edge Computing applications use a specific PDU session with the PDU Session anchor in the local site. The rest of applications use a PDU Session with a central PDU Session anchor. The mapping between applications and PDU sessions is steered by the URSP rules. Re-anchoring (SSC #2 and SSC #3) is used to optimize traffic routing for Edge Computing applications as the user moves.

SUMMARY

Embodiments for a method performed by a one or more network functions in a network for triggering a UPF re-anchoring for an application are disclosed. The method comprises receiving a trigger for a service related to an application in a User Equipment (UE) over a first Packet Data Unit (PDU) session anchored at a first User Plane Function (UPF), where the trigger may be a DNS request or an application level request or data. The method also comprises determining that UPF re-anchoring is required for the application based on the received trigger. The method also comprises determining if UPF re-anchoring is required, establishing a second PDU session to a local UPF to be used between the application in the UE and an edge application server; and if UPF re-anchoring is not required, providing the service for the application as triggered via the first UPF.

In one embodiment, determining that UPF re-anchoring is required further comprises extracting a Fully Qualified Domain Name (FQDN) from the DNS query and verifying that at least a Service Level Agreement SLA and/or policies related to the FQDN indicate that the UPF re-anchoring for the application is required.

In one embodiment, if re-anchoring is successful, and the trigger is a DNS query, then the DNS query should be dropped and not proceed further.

According to some embodiments, a method performed at a network function for triggering a UPF re-anchoring for an application are disclosed. The method comprises receiving a trigger for a service, which may be a DNS request or an application data/request) related to an application in a User Equipment (UE) over a first Packet Data Unit (PDU) session anchored at a first User Plane Function (UPF). The method also comprises providing information related to the trigger for a second network function to initiate UPF re-anchoring for the application and buffering the trigger. The method also comprises receiving an indication to discard the trigger in response to a successful UPF re-anchoring for the application and handling the trigger in response to an unsuccessful UPF re-anchoring for the application.

In one embodiment, the method also comprises starting a timer associated to the buffering of the trigger and in another embodiment handling the trigger for the service when the timer expires before receiving the indication to discard the trigger, i.e., forward to DNS or handle the application request/data.

Embodiments of a server system hosting one or more network functions of the same or different type and comprising one or more processing circuitry and one or more memory, the memory containing instructions executable by the processing circuitry whereby the server system is configured to perform any of the method embodiments described herein are disclosed. In some embodiments the network functions comprise at least a Session management function (SMF) and a User Plane function (UPF) but in other embodiments it may also include a network function performing the functions of the DNS AF as described herein.

Embodiments of a server system adapted to perform any of the method embodiments described herein are disclosed.

Embodiments of a server hosting a network function comprising one or more processing circuitry and one or more memory, the memory containing instructions executable by the processing circuitry whereby the server is configured to perform any of the any of the method embodiments described herein are disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
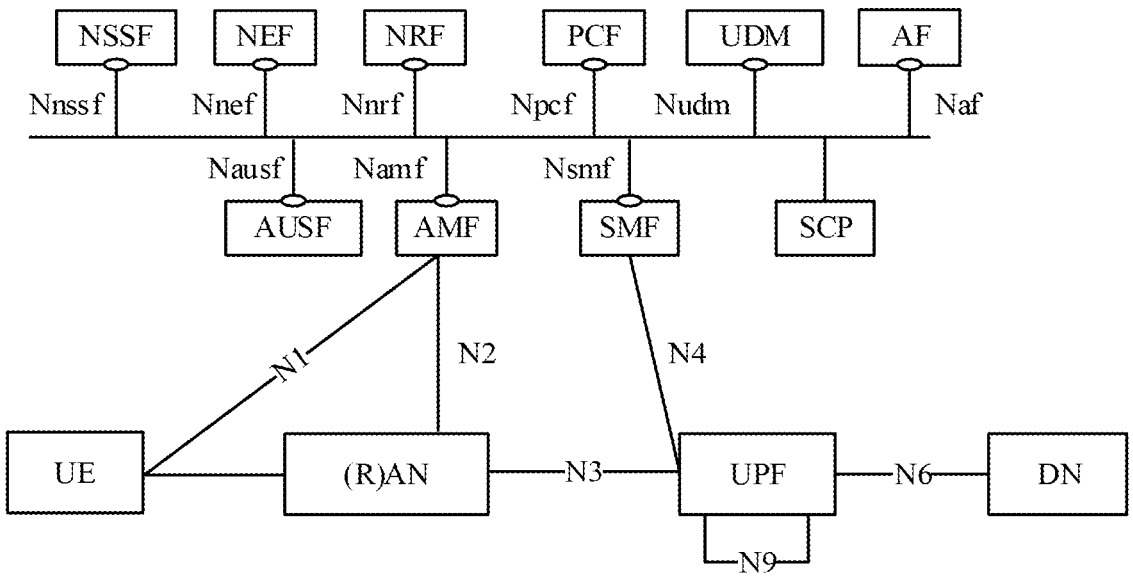
FIG. 1 (PRIOR ART) illustrates a "Fifth Generation (5G) Service Based Architecture (SBA), as described in Third Generation Partnership Project (3GPP) Technical Specification (TS) 23.501.
Figure 2:
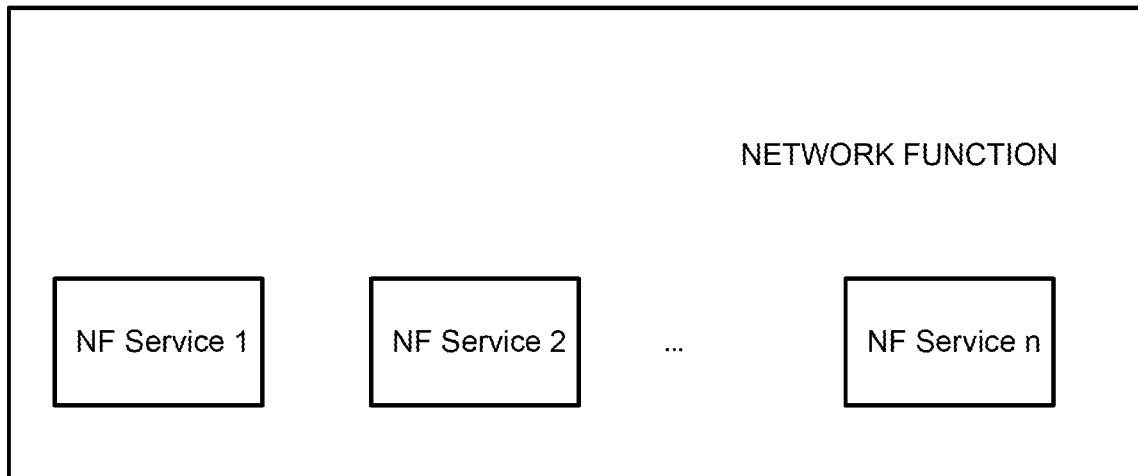
FIG. 2 (PRIOR ART) illustrates an example of a structure of Network Function (NF) consisting multiple service instances according to the 5G SBA.
Figure 3A:
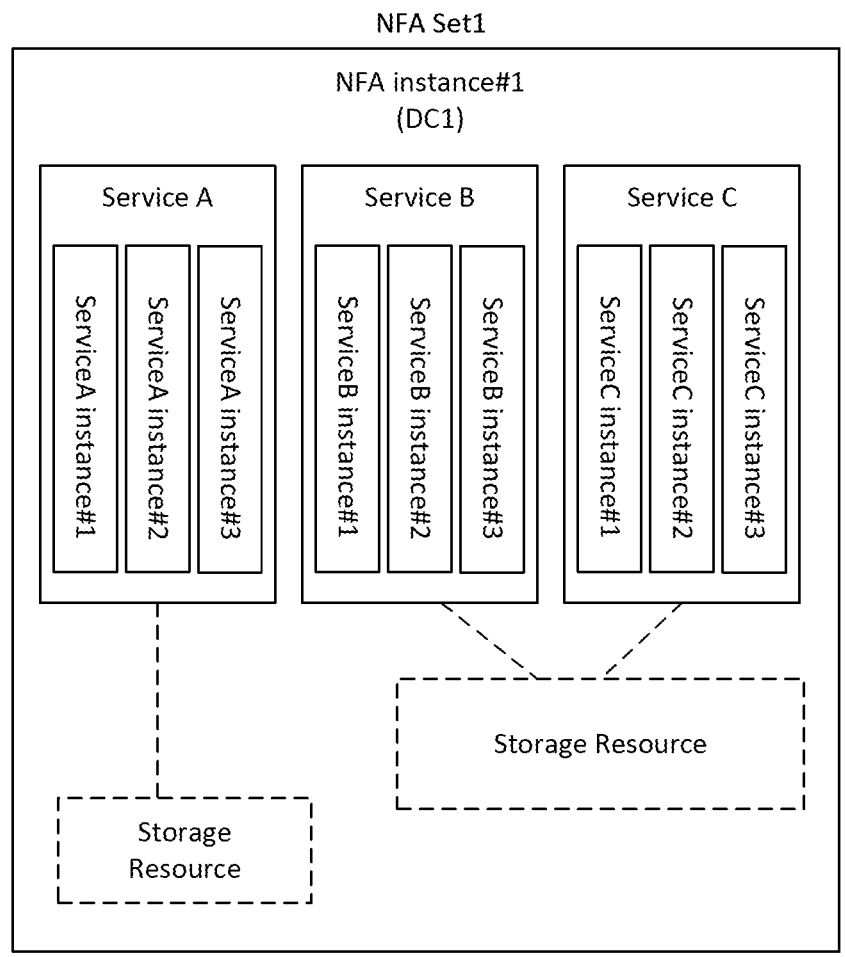
FIG. 3a-3c (PRIOR ART) illustrates three example of Network Functions (NF) deployment in the 5G SBA.
Figure 3B:
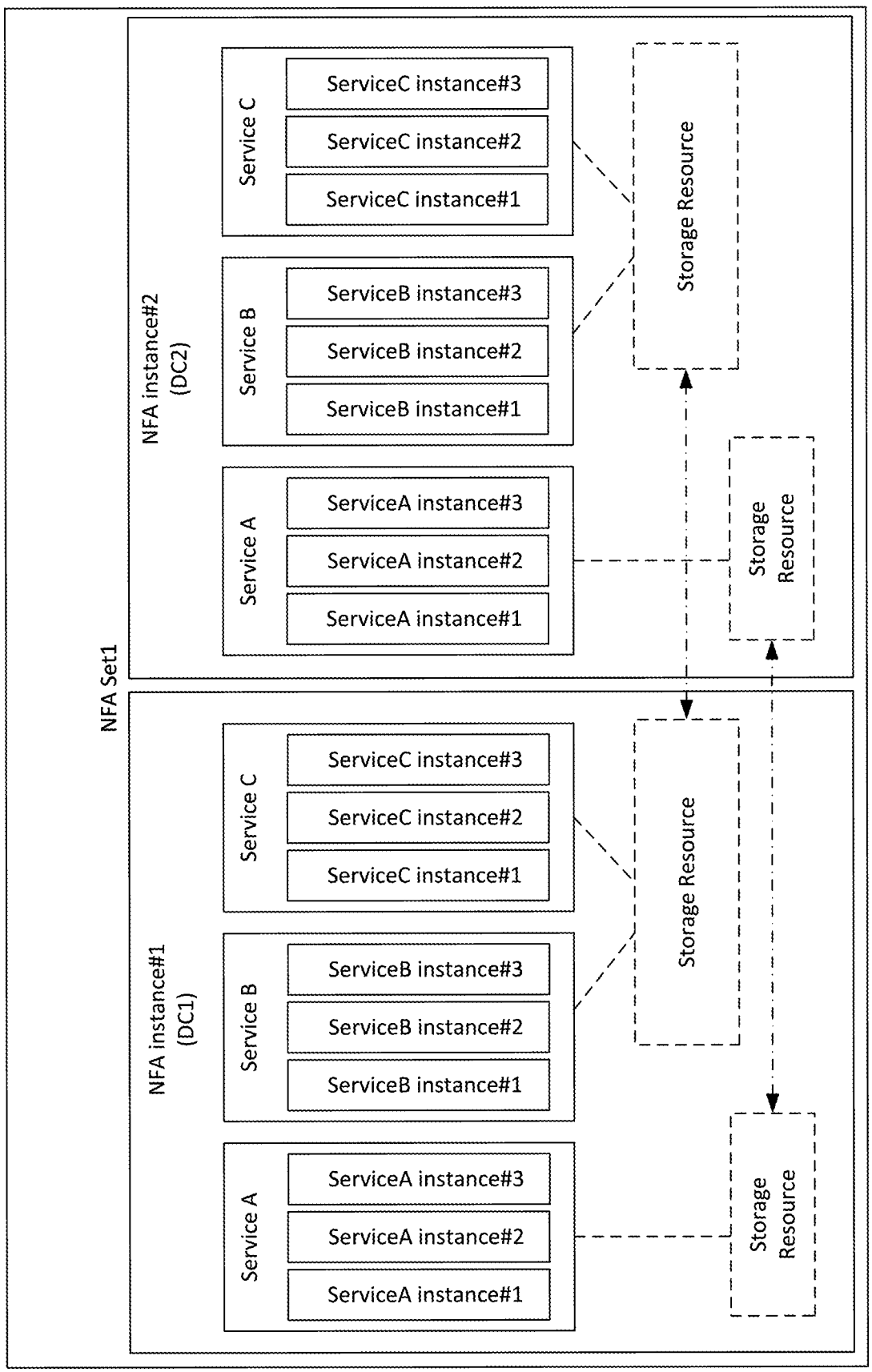
Figure 3C:
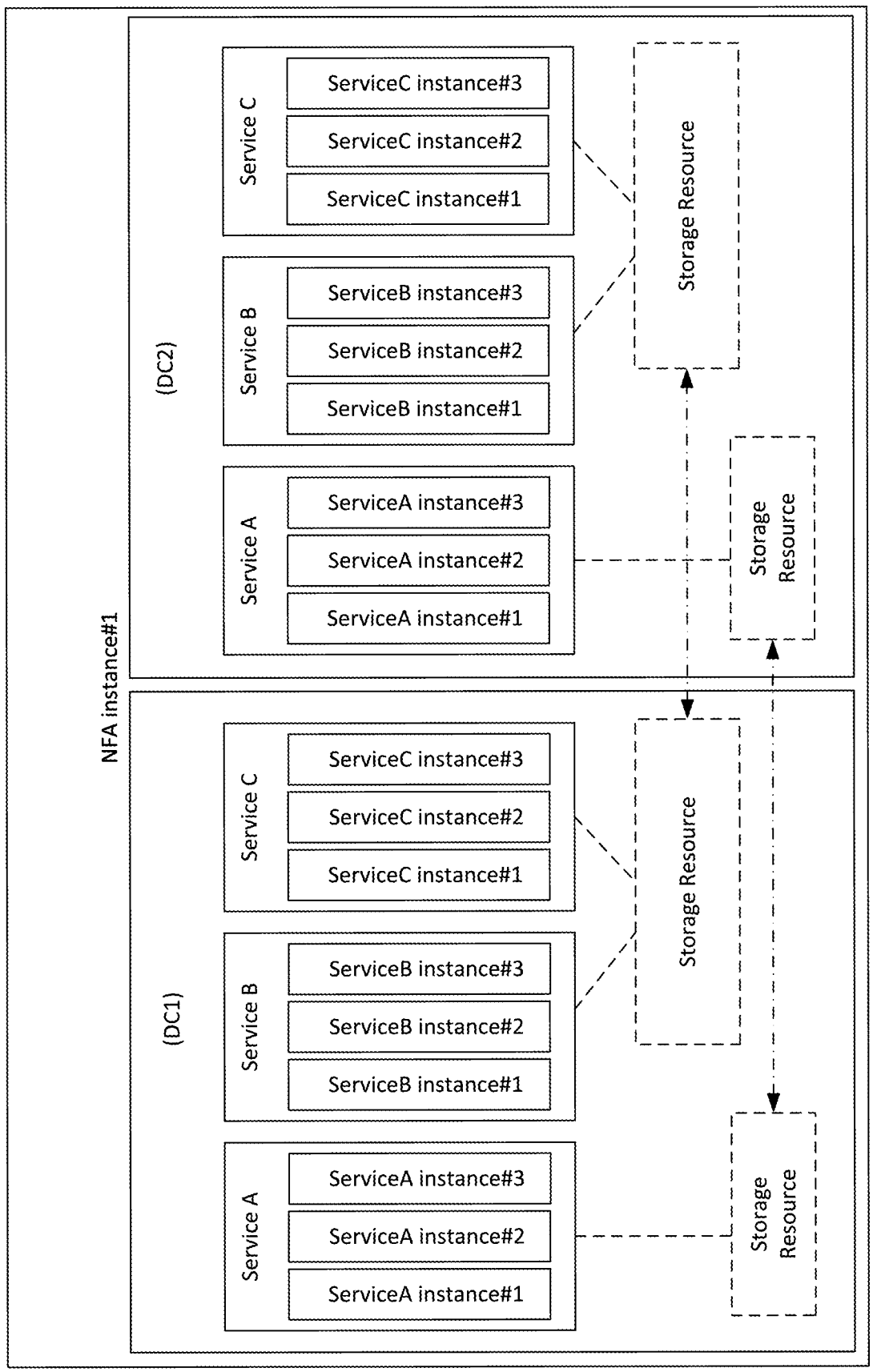
Figure 4:
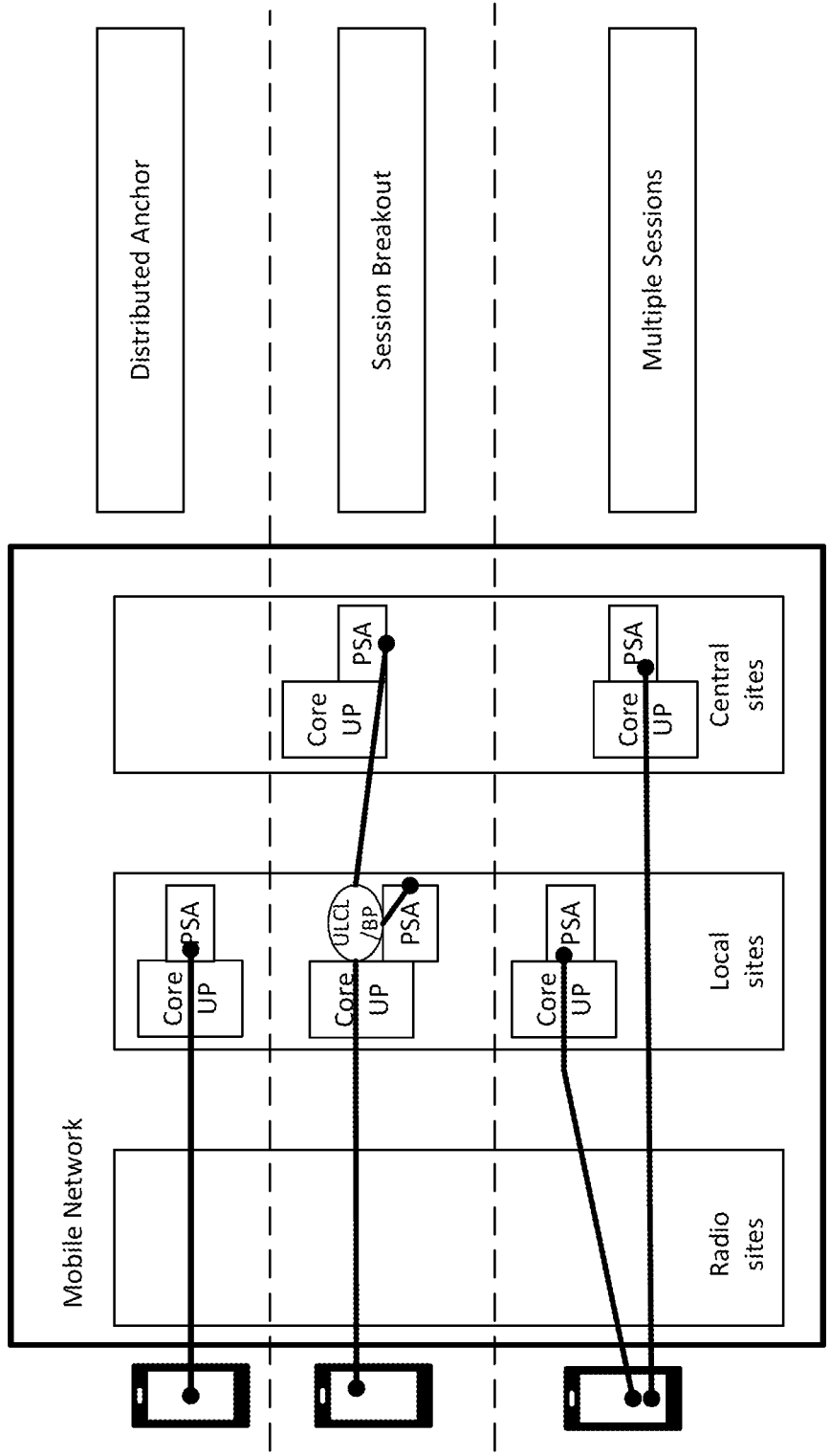
FIG. 4 (PRIOR ART) illustrates Connectivity models relevant for Edge Computing (EC)

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The embodiments are described herein using the 5G system as an example, however, it will be apparent to a skilled person in the art that the embodiments described herein can be applied to network functions or system of network functions performing similar edge computing and relocation based on application related trigger functionality, but may be a 4G or 6G or subsequent generations of networks.

The following are referred to in this application:

Stub Resolver: A simple DNS protocol implementation on the client side as described in [RFC1034], Section 5.3.1.

Authoritative Nameserver: A nameserver that has authority over one or more DNS zones. These are normally not contacted by Stub Resolver or end user clients directly but by Recursive Resolvers. Described in [RFC1035], Section 6.

Recursive Resolver: A nameserver that is responsible for resolving domain names for clients by following the domain's delegation chain. Recursive Resolvers frequently use caches to be able to respond to client queries quickly. Described in [RFC1035], Section 7.

Forwarding Resolver: A nameserver that passes that responsibility to another Recursive Resolver, called a "Forwarder" in [RFC2308], Section 1. Intermediate Nameserver: Any nameserver in between the Stub Resolver and the Authoritative Nameserver, such as a Recursive Resolver or a Forwarding Resolver. DNS is the most commonly used mechanism for Application clients to discover the IP address of Applications in the internet. It allows users to handle application hostnames and have them translated into the IP address of the Application Server.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node or a compute server implementing or hosting one or more network function/NF instance/NF set, such as Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

CP or UP Function: A function in a network, which has a defined functional behavior and defined interfaces.

Edge Application Server Discovery in Mobile Networks

3GPP Mobile Terminals have a DNS Stub Resolver in their Operative System that originates DNS queries as required by the Applications in the UE. At PDU session establishment, the Mobile Network can provide the UE with the address of a DNS server in the PCO, typically the operator DNS. The UE DNS client sends then the DNS queries of applications using that PDU session to the provided DNS server.

With Edge Computing (EC), Applications Servers can be distributed and be deployed at the edge of the cellular networks. In this scenario, there is a desire to be able to select the Edge Application Server that is closest to the UE. It is the topological distance that matters, that is the number of hops or the time it takes for a packet to travel from one host to the other, and that is not necessarily related to geographical distance, but it is related to how the traffic is routed between the UE and the Application Server. Therefore, for edge Computing both Edge Application Server and a suitable local UPF that steers the application traffic received on the N6 interface to the best access needs to be selected.

That is, the following is needed
DNS returning the Edge Application Server that is closets (topological distance) to the UE
A Local UPF, which provides
  the N6 interface access to the data Network (i.e. a PSA) with optimal routing to the that Edge Application Server
  For Breakout connectivity model, an ULCL able to selectively steer the UL traffic of this application to the selected PSA, and to aggregate the traffic of the PDU Session in the DL.
Note: There could be different UPFs for each of these two roles.

Centralization of resources is better than distribution from total cost of ownership point of view. Solutions which allow for example dynamic ULCL insertion are preferred.

When the Recursive Resolver is behind a central PDU session anchor and so topologically far from the query originator, its IP address cannot be used to tailor the response and provide an Edge Application server close to the UE. The response will in principle include the address of an Application Server which is close to the central PDU session anchor, even if another AS is deployed closer to the UE.

The 3GPP Technical Report TR 23.748 studies and performs evaluations of potential architecture enhancements to support Edge Computing (EC) in the 5G Core network (5GC) for Rel-17. One of the two main objectives is to study the potential system enhancements for enhanced Edge Computing support, including the discovery of IP address of application server deployed in Edge Computing environment.

Several solutions have been proposed in TR 23.748 for EAS discovery. The solutions are targeting different connectivity models for Edge Computing.

The solutions proposed for EAS discovery and selection in 3GPP TR 23.748 currently assume that:
Either the Distributed Anchor point connectivity model is assumed, in which case the UE IP address may be used at UE information for EAS selection, or
There is a central PSA for the original PDU session, in which case
  either a new PDU session (with a local PSA) is established by the UE for the EC applications (based on URSP rules), providing the multiple PDU connectivity model, or
  additional information about the UE location is provided to the Edge Application DNS authoritative server in form of ECS extension (IETF FC 7871) or (see e.g., Solution #3 in clause 6.3 of TR 23.748)

However, there is an important scenario that has not been handled. It could be assumed that the Mobile Network Operator (MNO) deployments will gradually distribute PSAs and during such migration phases, it may be that distributed PSAs can handle only a fraction of the UE traffic in the area of interest due to reasons such as cost, scalability, Internet access limitation etc. A solution would therefore be needed that provides a transition from the Centralized Anchor Point to the Distributed Anchor Point connectivity model on-demand, i.e., for specific UEs that would like to initiate sessions for which EC applies.

In this document, various embodiments describe a solution to this problem. Some embodiments present a functionality of on-demand transition to the Distributed Anchor Point connectivity model for a UE that initiates an EC related session. The trigger for the transition is e.g., the UE DNS query requesting FQDN resolution for an EC application. Based on the request, the MNO (e.g., SMF) decides if a Distributed Anchor Point is to be assigned for the UE PDU Session. If a Distributed Anchor Point is to be assigned, then the MNO either relocates the current PSA or sets up a new PDU session for the UE with a local PSA. The original DNS query is dropped, letting the UE repeat the DNS request through the new (local) PSA after failing to receive a response to the original request within a retransmission time window. The DNS which now receives the retransmitted request through the new (local) PSA resolves the FQDN into an AS close to the user location.

This is a solution for Application Server discovery and selection for Edge Computing in Mobile Networks that allows:
  applications to continue to use DNS as the mechanism for Edge AS (EAS) discovery, and
  operators to relocate the PSA or setup a new PSA for the given application during the selection process,
hence providing distributed anchors on a per-need basis which can contribute significantly in reducing the EC related operational costs in certain operator deployment scenarios.

The functionality required can be implemented independently or integrated to an existing network function (NF) of the 5G SBA, such as the SMF. If integrated with an SMF, the SMF could provide the following enhancements or simplifications, e.g.,
  No update is required to the standard procedures SMF which rely on existing 3GPP procedures to achieve re-anchoring.
  SMF has full access to the PDU Session information. This enables it to consider additional information in the re-anchoring decision. For example, some ongoing traffic in the session that does not support IP address change could influence the SMF to choose a SSC mode #3 type of re-anchoring rather than SSC mode #2 or use other EAS discovery and selection mechanisms e.g., Solution #3 in TR 23.748 that assumes "Session breakout" connectivity model using dynamic ULCL insertion.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 5:
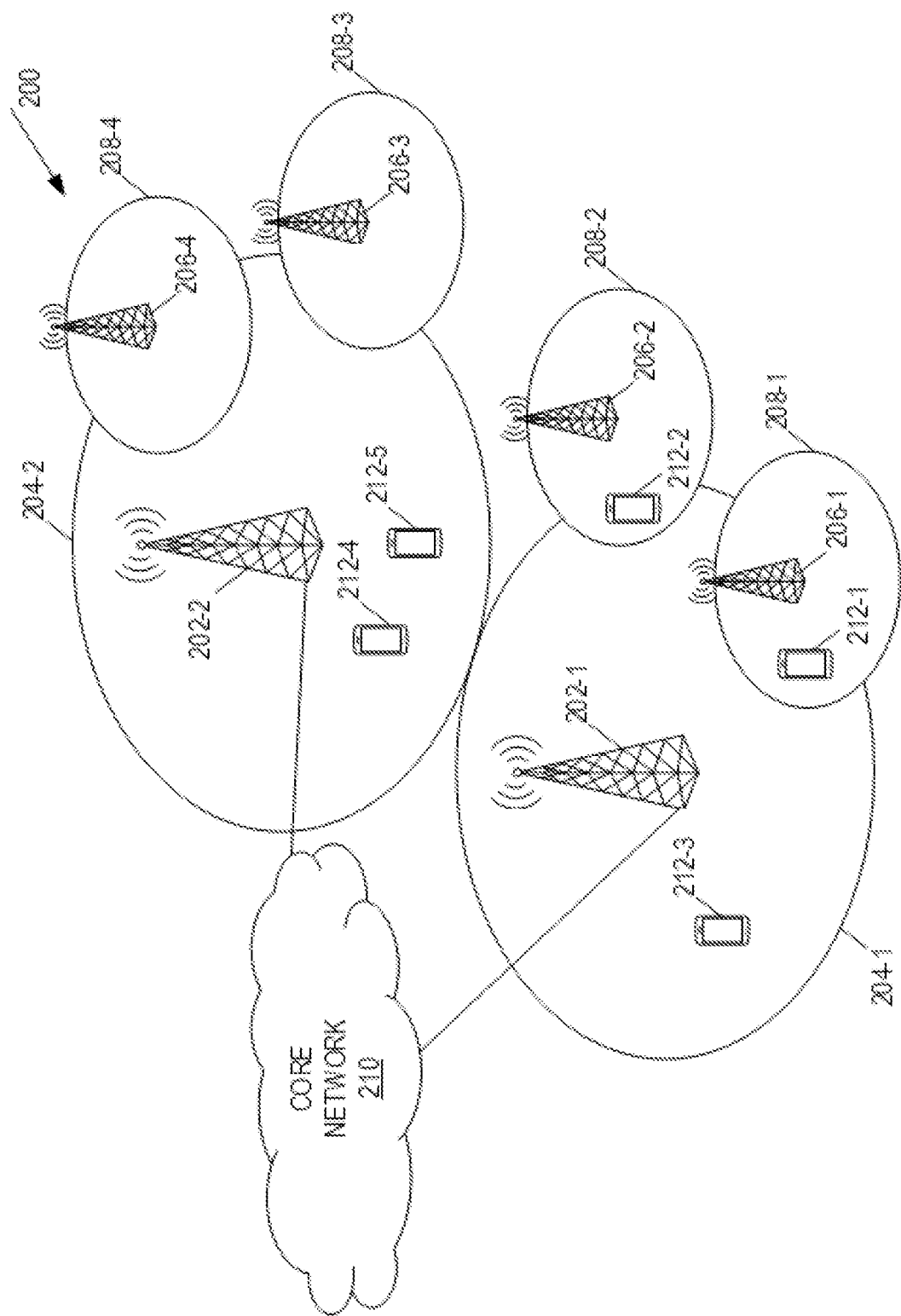
FIG. 5 illustrates one example of a cellular communication network according to some embodiments of the present disclosure.

FIG. 5 illustrates one example of a cellular communications system 200 in which embodiments of the present disclosure may be implemented. In the embodiments described herein, the cellular communications system 200 is a 5G system (5GS) including a NR Radio Access Network (RAN) or an Evolved Packet System (EPS) including a LTE RAN. In this example, the RAN includes base stations 202-1 and 202-2, which in LTE are referred to as eNBs and in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Required Functionality for Re-Anchoring for Edge Computing

Figure 6:
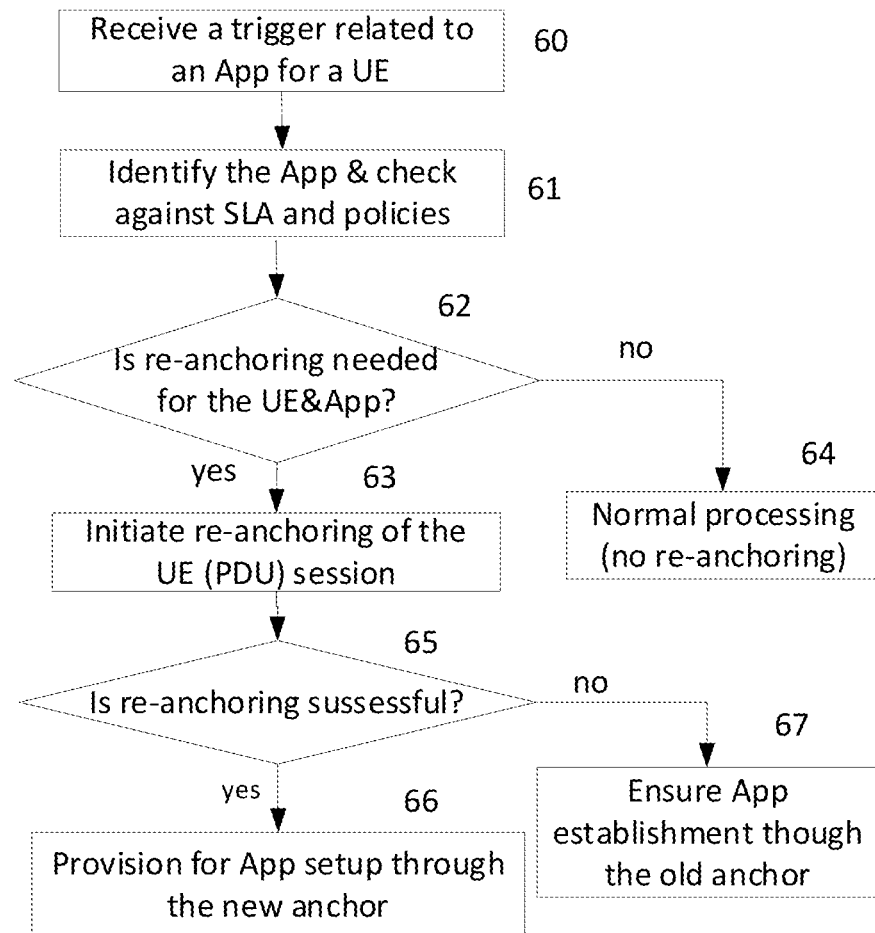
FIG. 6 illustrates an exemplary method for trigger for UPF re-anchoring for an application according to some embodiments of the present disclosure.

Embodiments for the generic functionality of the proposed new logic is shown in FIG. 6 that illustrates a method in accordance with one or more embodiments. The prerequisite of the method is that the user (UE) has a pre-established PDU session, and that for cost efficiency, the PDU session has been assigned a central PSA by for example an SMF in the 5G Core. The method starts with step 60 of receiving a trigger related to a specific application (App) to be started within the UE PDU session. There are multiple alternative embodiments for this trigger, each implying a slightly different procedure, e.g.:

- A DNS query from the UE: The App in the UE initiates a DNS query for the FQDN representing the service for which re-anchoring is needed. The corresponding embodiments for this option are further elaborated in sections I, II, III below.
- Trigger from an external AF: The application AF sends to the PCF (through the NEF) a Npcf_PolicyAuthorization_Create request, that triggers the PCF to initiate a routing request for the PDU session. This alternative embodiment for the method is further described in section IV below.
- The MNO uses a Deep Packet Inspection, DPI, engine (e.g., at the UPF) to differentiate traffic from, or of specific applications (apps). Discovery of certain applications for a given UE (user) will then trigger the procedure. Traffic differentiation can be based on DPI using for example the TLS client hello Server Name Indication (SNI), or it can be based on destination IP ranges published or provided by the Application provider, etc.

Once the trigger has been received, the new logic identifies at step 61 the App and checks the relevant SLA configurations and may also check or request for the policies related to the given App and user (PDU) session. At step 62, If UPF re-anchoring is required for the App, then at step 63, it initiates or triggers initiation of the UPF re-anchoring procedure of the corresponding PDU session, else no re-anchoring takes place (step 64). If at step 65, UPF re-anchoring was successful, then the method proceeds by facilitating at step 66 the App setup through the new anchor, e.g., providing a DNS resolver address at PDU session re-establishment procedure at UPF re-anchoring to force the UE to send another DNS request over the new PDU session. Otherwise the application continues over the previous UPF (step 67).

Figure 7:
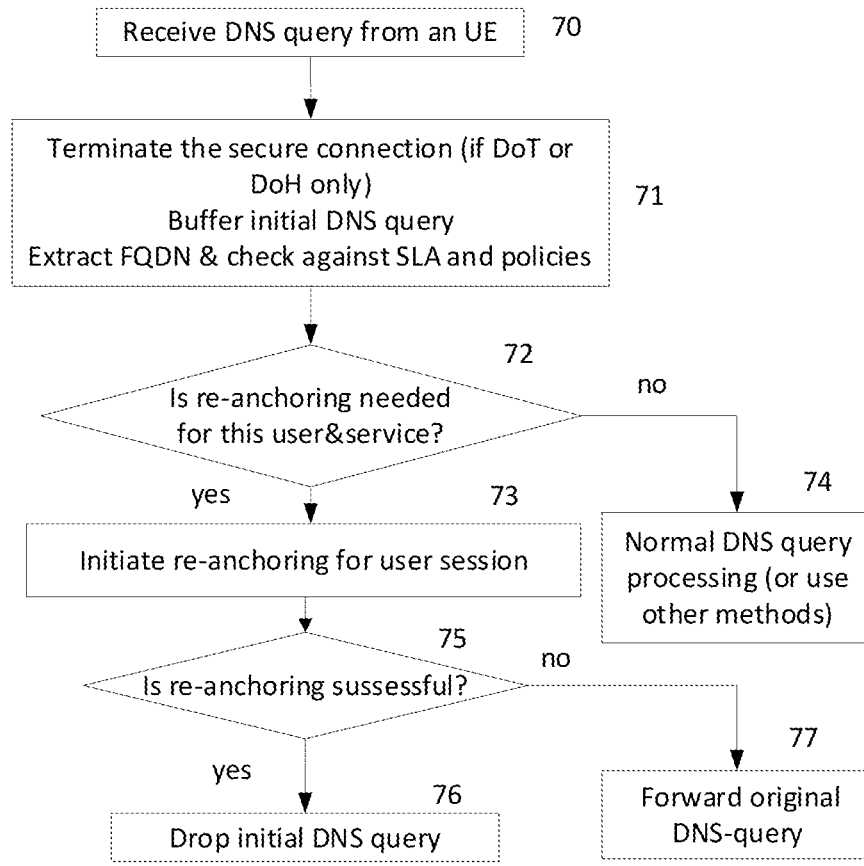
FIG. 7 illustrates an exemplary method for trigger for UPF re-anchoring for an application according to some other embodiments of the present disclosure.

I. Required Functionality in Case of the DNS Request Trigger is Received from the UE An embodiment of a method performed by the new logic is illustrated in FIG. 7. The new logic may be co-located within an existing NF of the 5G Core (such as SMF or UPF) or the NF in 5G Core is enhanced with the additional logic to support the embodiments herein. Other suitable NF could be used to host the additional logic. The new logic may also be a standalone network function NF. In this embodiment, the augmented NF or standalone NF receives a DNS query at step 70 (also referred to as request) from the UE over the PDU session. If the augmented NF is an SMF, the UPF first receives the DNS query over N3 reference point, filters out the DNS query and sends it to the SMF over N4 reference point. The DNS query from the client in the UE triggers initiation of a UPF re-anchoring by the augmented NF or standalone NF in the network. At step 71, if DNS over TLS or DNS over HTTP over TLS is used with the DNS query, the network is configured such that the NF that receives the DNS query (standalone NF or NF hosting the new logic or the UPF terminating the PDU session or the N3 reference point), terminates the secure connection. If the SMF is enhanced with the additional logic, the UPF could also terminate the secure connection for the DNS request received over N3 interface and forwards the DNS query to the SMF hosting the new logic. The augmented NF or standalone NF buffers the DNS query, extracts the FQDN and checks the relevant SLA configurations. It may further check or request for policies related to the given service (FQDN) and the user (PDU) session. At step 72, if it determines that re-anchoring is needed or should be applied for the service (i.e., App), it initiates at step 73 the re-anchoring procedure for the given session, otherwise the DNS request (query) is forwarded towards the DNS system/server (step 74). If at step 75, re-anchoring was successful or acknowledged, then the NF drops the initial DNS query (request) at step 76, i.e., does not forward it to the DNS system/server. When dropping the DNS request (query), the UE would subsequently retransmit another request after expiration of an internal retransmission time for the DNS request (query). If the re-anchoring was unsuccessful at step 77s or a timer associated to the buffering of the trigger expires before getting an indication of a successful re-anchoring, handle the DNS request by forwarding to the DNS or handling the trigger if the trigger is application request or data.

II. Stand-Alone DNS AF Functionality

Figure 8:
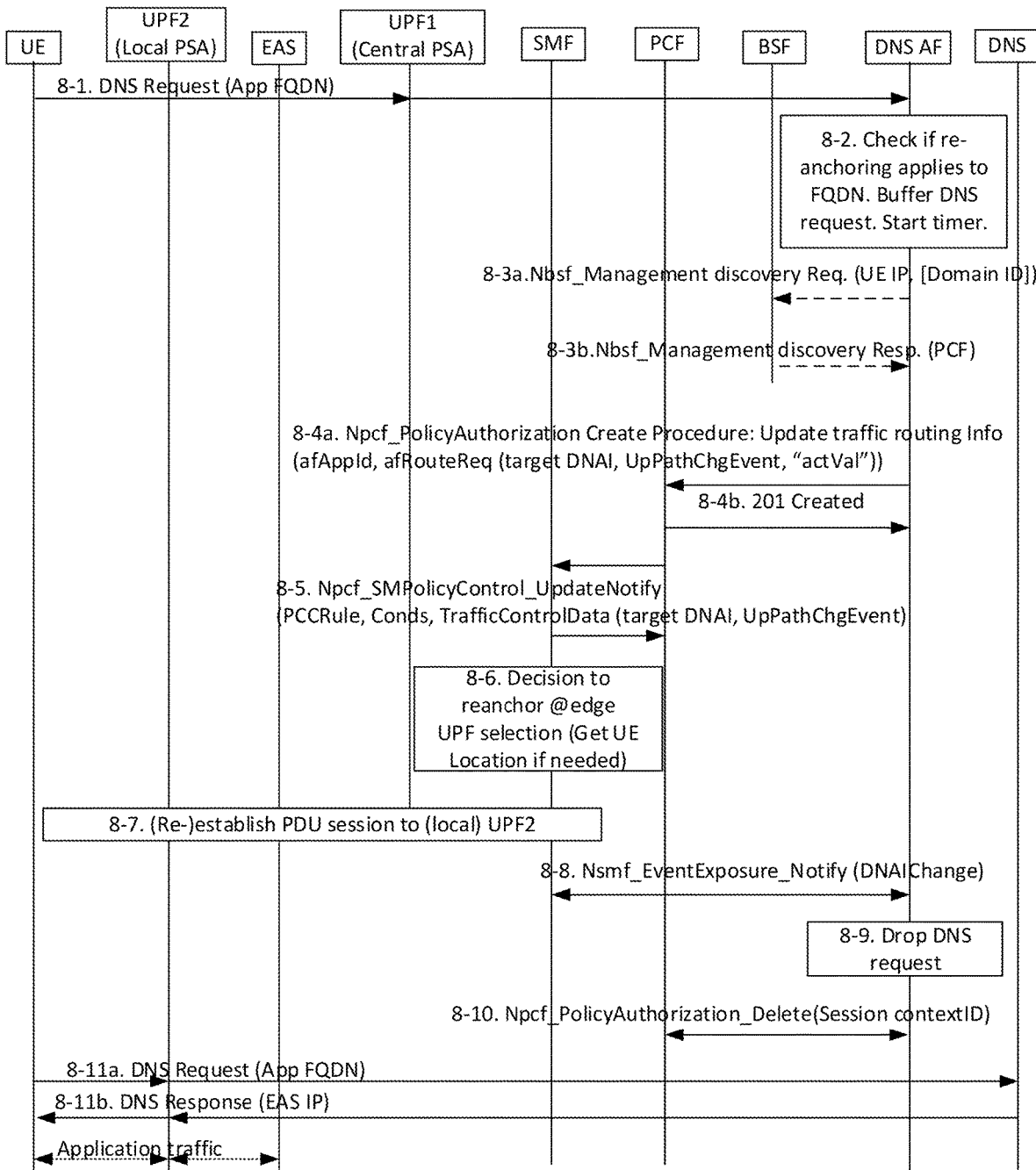
FIG. 8 illustrates an example sequence diagram for PSA/UPF relocation using a stand-alone DNS AF according to some embodiments of the present disclosure.

FIG. 8 illustrates an example sequence diagram for an embodiment illustrating the functionality of triggering UPF re-anchoring based on a DNS request implemented in a separate NF named a DNS application Function (AF). The DNS AF is not a full fledge DNS server as described herein.

When the UE establishes a PDU session for which Edge Computing (EC) should be applied, the 5G Core Network existing mechanisms could be used to enable the UE to send the DNS queries to the DNS AF. Example of such mechanism includes sending by the SMF to the UE in a PDU session establishment accept message, the PCO information element that comprises the DNS AF address to be used as a DNS server. The established PDU session is used for the communication of application traffic. The detailed steps are described below:

Step 8-1, the EC service is identified by a FQDN (the AS-FQDN). The application in the UE transmits a DNS discovery request to discover the Edge Application Server (EAS).

Step 8-2, the DNS AF receives the DNS request and determines if PDU session UPF re-anchoring is required for the application. To determine if UPF re-anchoring is required, the DNS AF extracts the FQDN from the DNS request and checks whether the FQDN is under SLA agreement for Edge Breakout. If UPF re-anchoring is needed, the DNS AF extracts the UE IP address, buffers the DNS request, and starts a timer for the re-anchoring procedure that it initiated, which is also used as a timer for monitoring the buffering of the trigger.

Step 8-3 *a-b*, the re-anchoring procedure is initiated by updating the traffic info into the PCF involved with the PDU session. If there are more than one PCFs, the DNS AF contacts a Binding Support Function (BSF), used for binding an application function request to a specific PCF instance, to find the PCF for the PDU session first. In order to be able to communicate with BSF (and PCF at step 8-4), the DNS AF needs to be deployed before the NAT and the IP address that is extracted at step 8-2 is complemented with a Domain Identifier in overlapping UE IP scenarios when querying the BSF. The DNS-AF receives the PCF for the UP PDU session.

Step 8-4 *a-b*, The DNS AF sends to the PCF a Npcf_PolicyAuthorization_Create request, by which the DNS AF initiates a request for the PDU session (identified by the UE IP address/domain ID) to be re-anchored/re-routed. The Npcf_PolicyAuthorization_Create request comprises the following information:
the update traffic routing info,
the afAppId, and
afRouteReq to request re-anchoring of the UPF including the target DNAI The afAppId does not identify only the DNS AF but the application, e.g. by being decorated with the AppId corresponding to the FQDN. The PCF authorizes the request based on the received information. One or more of the information allows the PCF to authorize the received request from the DNS AF for a specific PDU Session and for a specific application. The target DNAI provided does not necessarily identify a specific DN access location but represents the closest PSA to the UE. If the PCF authorizes the request, it creates the App session and responds with a 201 created message as acknowledgement that the request is authorized.

Step 8-5, The PCF determines the policies and provisions the corresponding PCC rules to the SMF instructing the SMF to steer all the user traffic for the application to the provided DNAI which does not identify a specific DN access location but instead identifies the closest PSA for the UE application.

Step 8-6, The SMF proceeds to select a local UPF to be the closest PSA for the UE. The SMF may require the UE more recent location. If the more recent UE location is not available at the SMF, the SMF obtains the UE location from the AMF by invoking Namf_EventExposure service with OneTime Report type as described in 3GPP TS 29.518, chapter 5.3.1).

The SMF initiates re-anchoring for the application to the selected local PSA (UPF2) using the information obtained by the PCF and the more recent location information. Both SSC mode 2 and SSC mode 3 procedures described in 3GPP TS 23.501 and TS 23.502 could be applied.

Step 8-7, as part of the SSC mode 2 and SSC mode 3 procedures, the SMF requests the UE to re-establish the PDU session. During the PDU session re-establishment by the UE, the SMF provides a PCO comprising, this time, the MNO DNS address for the DNS resolution for the new session, and not the DNS AF. The UE re-establishes the PDU session, this time the PDU session is anchored at the local PSA (UPF2). Monitoring of the traffic in the local PSA/UPF2 is activated by the SMF to track the UE traffic activity.

Note: inactivity reports from the local PSA/UPF2 may later trigger another re-anchoring back to a central PSA.

Step 8-8, the SMF notifies the DNS AF about the change of the PSA (DNAI change). If the notification is not received in the DNS AF before the timer started in Step 8-2 expires, then at expiration of the timer, the re-anchoring is considered unsuccessful and the original DNS request is forwarded to a DNS server for resolution.

Step 8-9, based on the notification from the SMF indicating re-anchoring has been successful, the DNS AF drops the DNS request that it has buffered at step 8-2.

Step 8-10, the Application Session context created at step 8-4 is deleted by the DNS AF as the new PDU session has been established with the local PSA/UPF2. Alternatively, the PCF may remove the context after it has obtained confirmation from the SMF that the PDU session to the local PSA/UPF2 is successfully established.

Step 8-11 *a-b*, after establishing the PDU session at step 8-7, the UE retransmits a DNS request, this time using the MNO DNS provided in the PCO. The DNS request is transmitted over the established PDU session to the local PSA/UPF2 which is forwarded to the DNS resolver (MNO DNS). The DNS request is resolved to an Edge Application Server.

The transmission of the Application Traffic starts between the UE and the selected Edge AS over the local PSA/UPF2.

III. DNS Component as Part of the SMF

Figure 9:
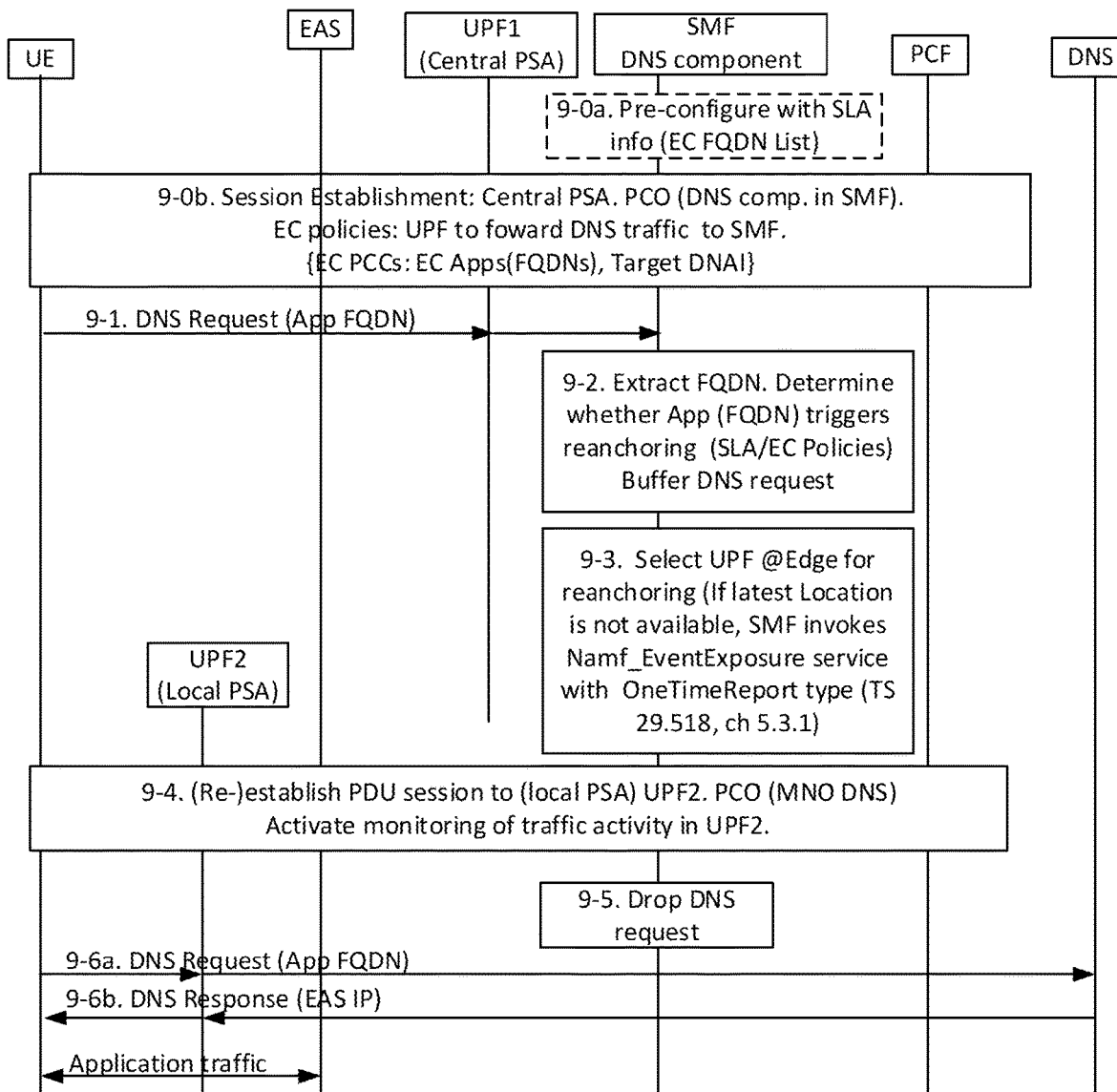
FIG. 9 illustrates an example sequence diagram for PSA/UPF relocation when the new logic is deployed as part of the SMF according to some embodiments of the present disclosure.

The case when the proposed functionality for a DNS query trigger is deployed in the SMF offers possibilities for simplification, as depicted in FIG. 9. The pre-requisite shown in Steps 9-0*a* and 9-0*b* consist of:

a. If static policies are pre-configured in the SMF comprising the DNS AF, i.e., hosting the DNS component, it is further pre-configured with the SLA agreement for Edge break-out. In this embodiment, it is assumed that the SMF has information of the FQDNs which require local access and the PSAs which are closest to the UE location are preferred.

Note: The SMF has no information of which UE PDU session is allowed to be re-anchored for which service (FQDN), unlike variant b below.

b. Or, if policies are dynamically provided by the PCF to the SMF as part of the PDU session establishment (to a central PSA UPF1) and dynamically provided when changes to policies are identified, the PCF provides the SMF with the corresponding PCC rules which include the FQDNs allowed for EC and the corresponding DNAIs for the established PDU session. The DNAI provided does not point to a specific location but refers to the PSA that is closest to the UE. The PCF may determine PCC rules based on policies specific to the DNS requests.

As part of the PDU Session establishment, the SMF provides to the UE a PCO information element indicating the DNS address to use for sending DNS requests. The SMF also configures the UPF is to forward certain DNS requests to the SMF. The following describes the steps illustrated in the sequence diagram of FIG. 9 following the pre-requisite steps 9-0a and 9-0b.

Step 9-1, the PDU session is already established. the EC service is identified by an FQDN; the AS-FQDN. The application (App) in the UE sends a DNS discovery request to discover the Edge Application Server (EAS). The DNS discovery request is forwarded by the central PSA (UPF1) to the SMF.

Step 9-2, the SMF extracts the FQDN and determines whether the App (with FQDN) triggers UPF re-anchoring for Edge Breakout. If yes, then the SMF buffers the DNS request. The determination whether UPF re-anchoring for the application could be based either on SLA information locally configured in the SMF or based on the PCC Rules provisioned by the PCF for the PDU Session.

Step 9-3, the DNAI provided does not point to a specific UE location but represents the closest PSA to the UE. The SMF selects a local PSA (UPF2) that is the closest possible to the UE for the application.

If the latest (or more recent, or current) UE Location is not available, the SMF retrieves the UE location from the AMF by invoking Namf_EventExposure service with OneTime Report type (as described in 3GPP TS 29.518, clause 5.3.1). The location is then used in selecting the local PSA (UPF2).

Step 9-4. The SMF initiates re-anchoring to the selected local PSA (UPF2). Any of the existing SSC mode 2 and SSC mode 3 procedures could be applied, where the SMF requests the UE to re-establish the PDU session (via for example a PDU session establishment modification/release with indication to re-establish the PDU session) and the local PSA (UPF2) is assigned as the local anchor for the PDU session. The SMF provides a DNS resolver address in the PCO IE to the UE as part of the new PDU session establishment procedure with to the UE. Usage reporting for the relevant EC flows is activated in the local PSA (UPF2) to track the activity. Note: inactivity reports from UPF2 may later trigger another re-anchoring back to a central PSA.

Step 9-5, The SMF drops the DNS request buffered at step 9-1.

Step 9.6a, 9-6b, The UE sends again the DNS Request for that same FQDN (e.g., after expiration timer at the UE). The DNS request goes through the Local PSA (UPF2) to the DNS resolver provided at the session establishment of the new session, and it is resolved to an Edge AS as described in Solution 6.X of TR 23.748. The Application Traffic then starts towards the selected Edge AS.

IV. Trigger from External AF

Figure 10:
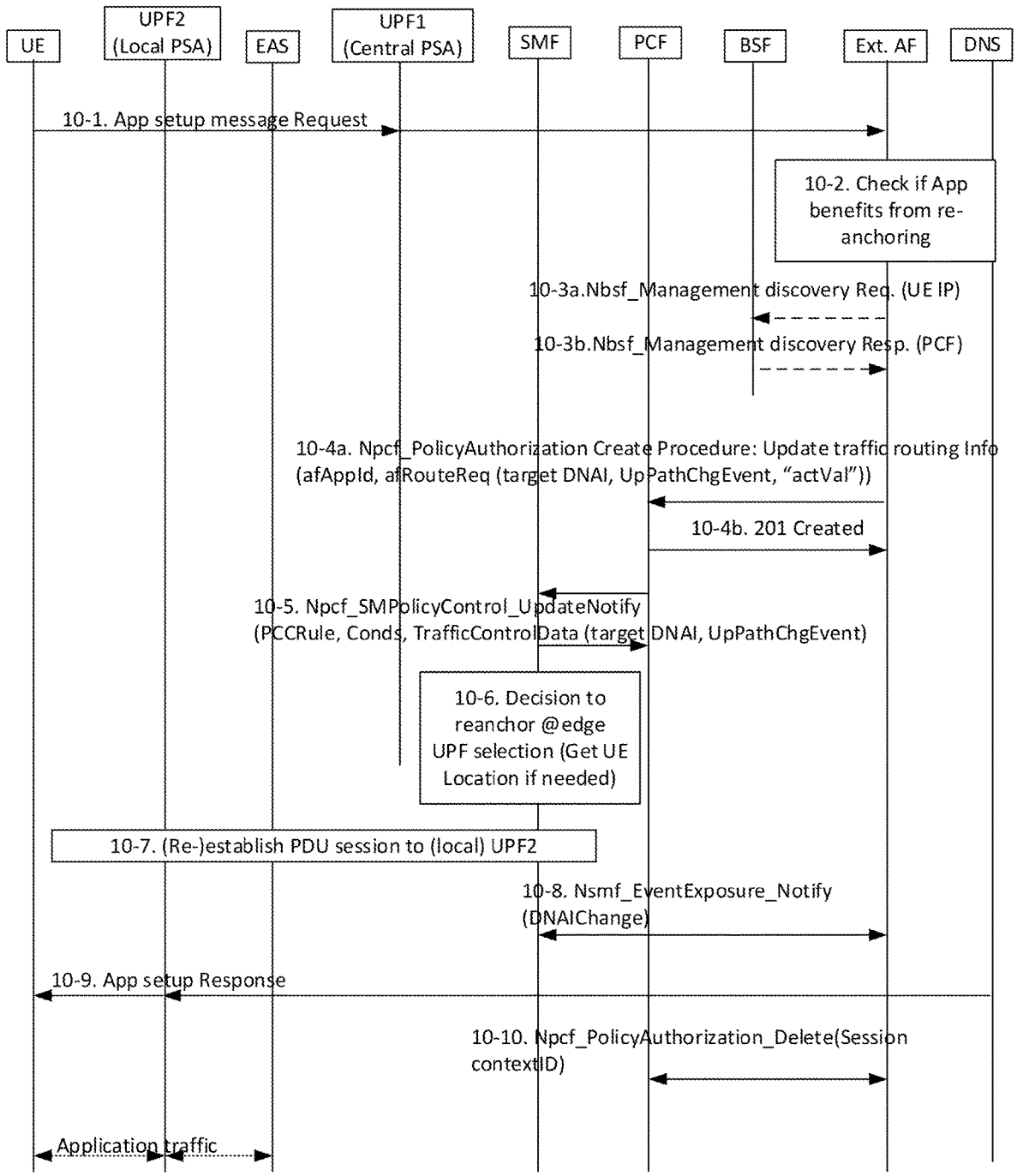
FIG. 10 illustrates an example of PSA/UPF re-anchoring based on external AF trigger according to some embodiments of the present disclosure.

The embodiments describing when the trigger for UPF re-anchoring is received at the core network from an external AF are described herein and illustrated in FIG. 10.

Step 10-1, The external AF receives a trigger for an App setup message request over an established PDU session in the core network, where the PDU session is anchored at a central PSA/UPF1. The App setup request may be for example a TCP Syn or an HTTP request, or other application suitable protocol).

Step 10-2, The AF determines whether the App could benefit from UE re-anchoring to a local PSA (UPF2). As an example, based on the current UE IP address as well as the AS server distribution.

Step 10-3-Step 10-8, As in Steps 8-3 to 8-8 in FIG. 8 (note the usage of the DNAI is for this purpose as described in the referenced steps.)

Step 10-9, The external AF transmits an App setup response to the UE in response to the setup message in Step 10-1. The App setup response may be for example a redirect which resolves to an EAS that is closer to the new anchor.

Step 10-10, Same as Step 8-10 in FIG. 8.

Figure 11:
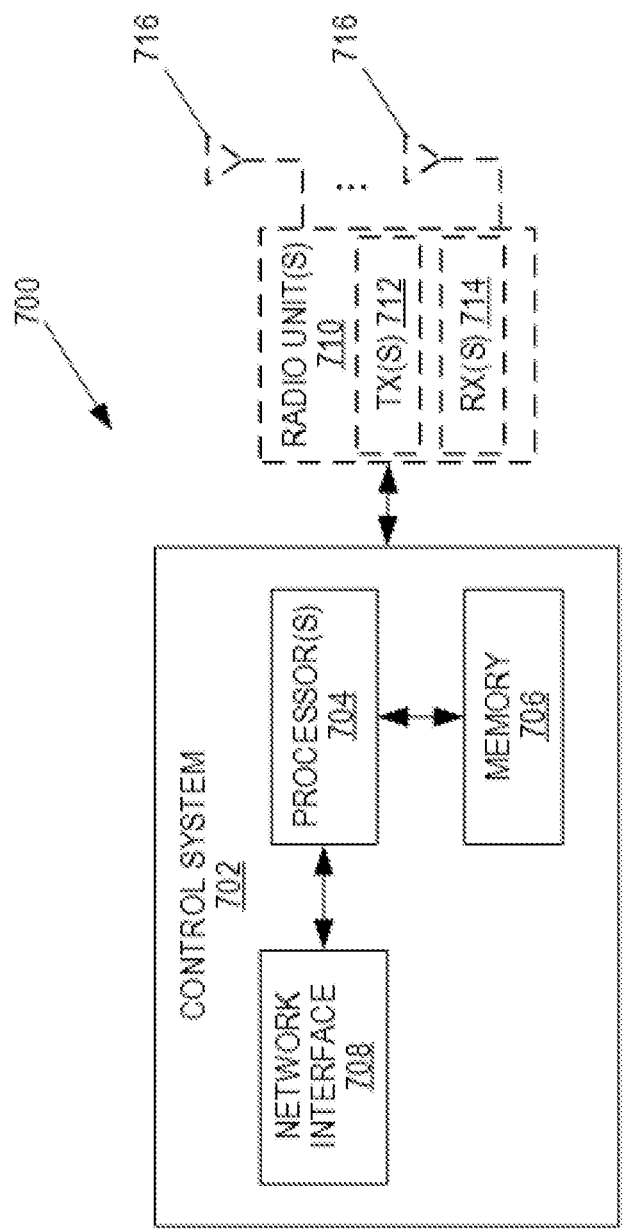
FIG. 11 is a schematic block diagram of a network node, and particularly a network node acting as a radio access node according to some embodiments of the present disclosure.

FIG. 11 is a schematic block diagram of a network node 700 according to some embodiments of the present disclosure. The network node 700 may be, for example, a radio access node, such as a base station 202 or 206, or a core network node. As illustrated, the network node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. The network node hosting a core network network function software is also as a server that may be deployed in a datacenter.

In addition, if the network node 700 is a radio access node, for example, it may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a network node 700 as described herein. In some embodiments, the function(s) are implemented in software that is stored, e.g., in the memory 706 and executed by the one or more processors 704.

Figure 12:
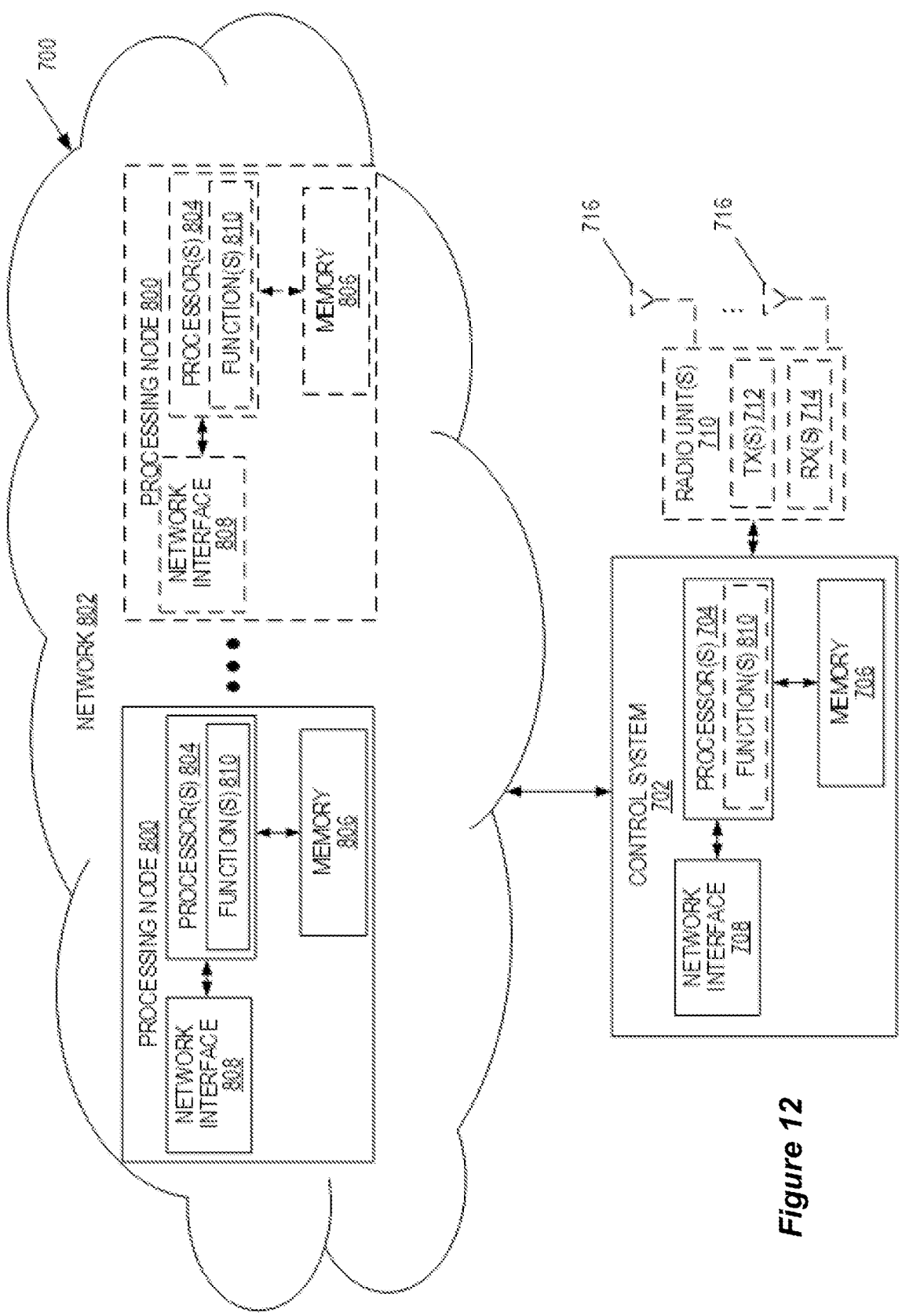
FIG. 12 is a schematic block diagram that illustrates a virtualized embodiment of a network node of FIG. 11 according to some embodiments of the present disclosure.

FIG. 12 is a schematic block diagram that illustrates a virtualized embodiment of the network node 700 according to some embodiments of the present disclosure. This discussion is equally applicable to other types of network nodes. Further, other types of network nodes may have similar virtualized architectures.

Multiple NFs are used to perform the embodiments described herein. The multiple NFs may be deployed in a system of servers or a single server.

As used herein, a "virtualized" node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes the control system 702 that includes the one or more processors 704 (e.g., CPUs, ASICs, FPGAs, and/or the like), the memory 706, and the network interface 708 and, optionally, the one or more radio units 710 that each includes the one or more transmitters 712 and the one or more receivers 714 coupled to the one or more antennas 716, as described above. The control system 702 may be connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the network node 700 described herein are implemented at the one or more processing nodes 800 or distributed across the control system 702 and the one or more processing nodes 800 in any desired manner. In some particular embodiments, some or all of the functions 810, consisting of one or more NF instances, of the network node 700 described herein are implemented as virtual components executed by one or more virtual machines or container implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of network node 700 or a node (e.g., a processing node 800) which may be a computer server or a system of computer server implementing one or more of the functions 810 (NF or NF instance of 5G Core) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a computer readable medium or non-transitory computer readable medium such as memory). When storing and/or downloading the computer program on the target node, compute server or compute server system enables starting or instantiating, configuring one or more NF, NF instance, NF set.

Figure 13:
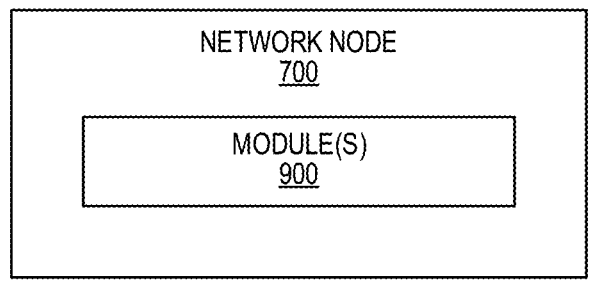
FIG. 13 is a schematic block diagram of the network node of FIG. 11 according to some other embodiments of the present disclosure.

FIG. 13 is a schematic block diagram of the network node/server 700 according to some other embodiments of the present disclosure. The network node/server 700 includes one or more modules 900, each of which is implemented in software. The module(s) 900 provide the functionality of the network node 700 described herein, e.g., SMF. The modules may consist of microservices or the services provided by the NF, where each service is described by its API.

Figure 14:
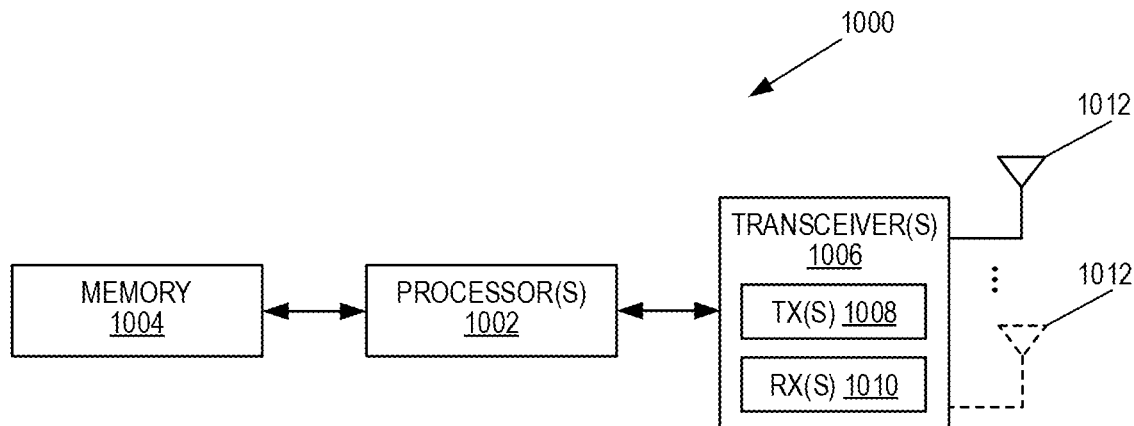
FIG. 14 is a schematic block diagram of a UE according to some embodiments of the present disclosure.

FIG. 14 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
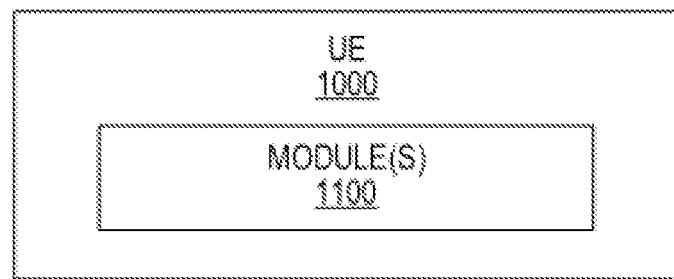
FIG. 15 is schematic block diagram of the UE of FIG. 14 according to some embodiments of the present disclosure.

FIG. 15 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 16:
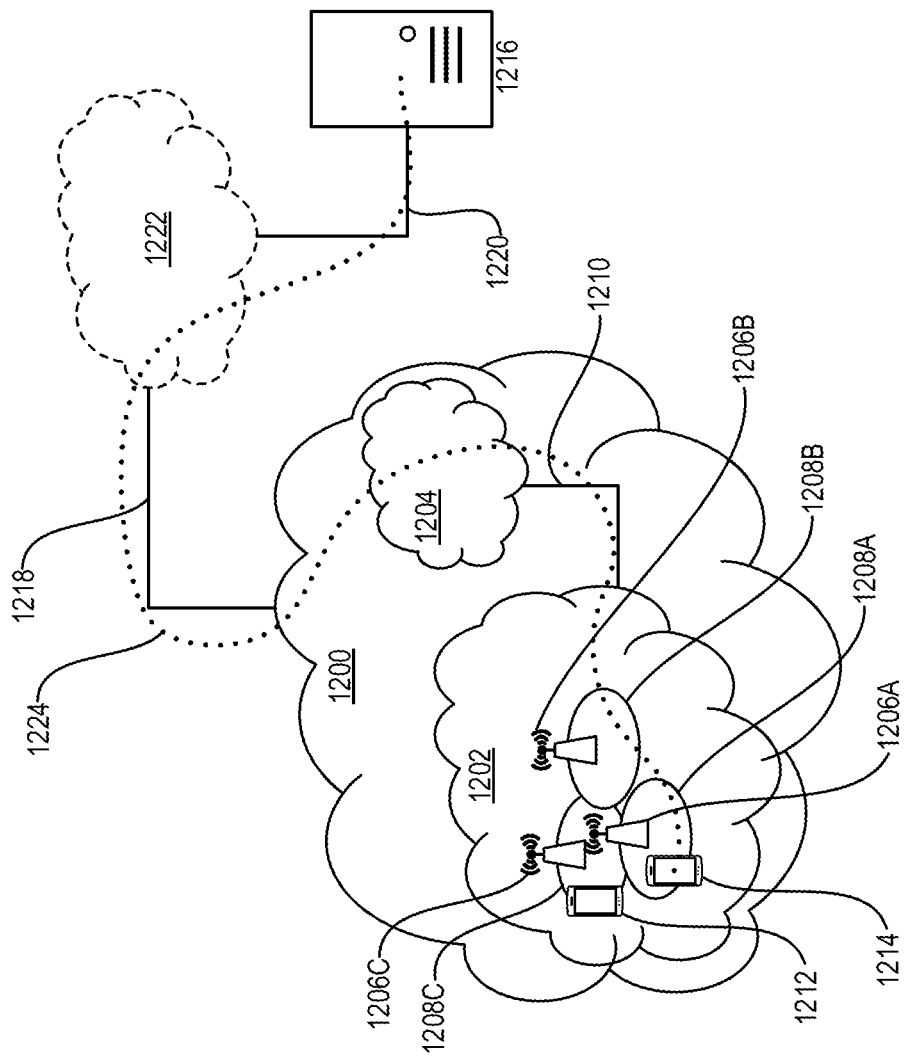
FIG. 16 illustrates a communication system that includes a telecommunication network operable with the UE of FIGS. 14 and 15 and having network nodes of FIGS. 11-13 capable of supporting the functionality of the present disclosure.

FIG. 16 illustrates a telecommunication network according to some embodiments of the present disclosure. With reference to FIG. 16, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as Node Bs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 16 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Figure 17:
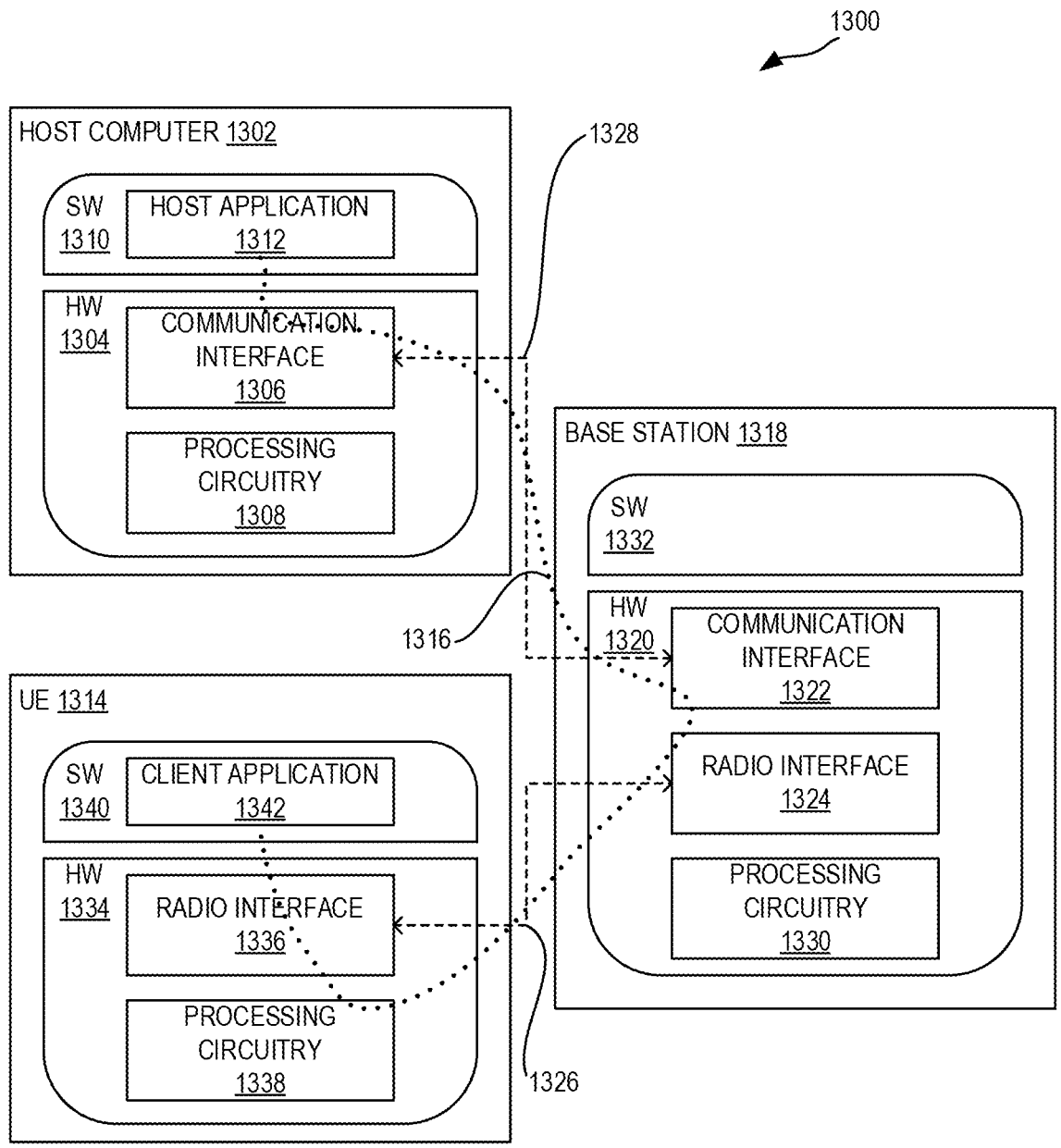
FIG. 17 illustrates a UE, base station, and host computer such as may be present in the communication system of FIG. 16.

FIG. 17 illustrates a communication system according to some embodiments of the present disclosure. Example implementations, in accordance with an embodiment, of the UE, base station, and host computer discussed in the preceding paragraphs will now be described with reference to FIG. 17. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area served by the base station 1318. The communication interface 1322 may be configured to facilitate a connection 1328 to the host computer 1302. The connection 1328 may be direct or it may pass through a core network of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

It is noted that the host computer 1302, the base station 1318, and the UE 1314 may be similar or identical to the host computer 1216, one of the base stations 1206A, 1206B, 1206C, and one of the UEs 1212, 1214 of FIG. 16, respectively. This is to say, the inner workings of these entities may be as shown in FIG. 17 and independently, the surrounding network topology may be that of FIG. 16.

In FIG. 16, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may provide for the ability to measure data usage in terms of packets and thereby provide benefits such as enhance the system's ability to derive a proper traffic model in the mobile network, which is vital for dimensioning and deployment.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EXAMPLE EMBODIMENTS

While not being limited thereto, example embodiments of the present disclosure are provided below.

1. A method comprising:
receiving a trigger related to an application associated to a PDU session anchored at a UPF;
determining if re-anchoring is required for the user device using the application;
In response to determining that re-anchoring is required, initiating re-anchoring to a local UPF and upon determining that re-anchoring is successful, facilitating application setup through the local UPF; and
In response to determining that re-anchoring is not required, providing the service as triggered via the UPF.

2. The method of embodiment 1 wherein the trigger is a DNS query received from the UE.

3. The method of embodiments 1 and 2 wherein determining if re-anchoring is required comprises extracting the FQDN from the DNS query and verifying the SLA and or policies related to the FQDN.

4. The method of embodiment 1 to 3 wherein in response to determining that re-anchoring is successful, dropping the DNS query (i.e., do not respond).

5. A compute server or compute server system hosting one or more NF instance of the same or different type and comprising one or more processing circuitry and one or more memory, the memory containing instructions executable by the processing circuitry whereby the compute server or compute server system is configured to perform any of the embodiments 1-4.

6. A compute server or compute server system adapted to perform any of the embodiments 1-4.

7. A non-transitory computer readable medium containing a computer program or instructions, wherein when the computer program or instructions is executed by a computer/compute server, causes it to perform any of the embodiments 1-4

8. A computer program comprising instructions which, when executed by at least one processor of a compute server, causes the compute server to carry out the steps of any of the method embodiments.

9. A carrier containing the computer program of embodiment 8, wherein the carrier is one of an electronic signal, optical signal, radio signal, or computer readable storage medium.

Abbreviations

At least some of the following abbreviations may be used in this disclosure. If there is an inconsistency between abbreviations, preference should be given to how it is used above. If listed multiple times below, the first listing should be preferred over any subsequent listing(s).

5GC 5th Generation Core Network
AF Application Function
AMF Access and Mobility Management Function
AS Application Server
DC Data Center
DL Downlink
DN Data Network
DNN Data Network Name
DNAI DN Access Identifier
DNS Domain Name System
DPI Deep Packet Inspection
EAS Edge Application Server
EC Edge Computing
ECS EDNS Client Subnet
MNO Mobile Network Operator
NF Network Function
SMF Session Management Function
SSC Service and Session Continuity
PCF Policy Control Function
PCO Protocol Configuration Option
PSA PDU Session Anchor
UPF User Plane Function
UE User Equipment

The invention claimed is:

1. A method performed by a first network function in a network handling domain name request for Edge Application Server (EAS) discovery, the method comprising:
receiving a DNS query to discover Edge Application Server (EAS) from a User Equipment connected to a first User Plane Function over a first PDU session;
transmitting information for a second network function in response to the DNS query, the information triggering relocating the UE to a second UPF by the second network function; and
receiving a message as a result of relocating the UE to the second UPF, the message indicating a DNS response to the DNS query should not be transmitted to the UE.

2. The method of claim 1 further comprising receiving a second DNS query to discover the Edge Application server (EAS) from the UE connected to the second UPF.

3. The method of claim 1 further comprising extracting a Fully Qualified Domain Name (FQDN) from the DNS query and verifying that policies related to the FQDN indicate that the UPF re-relocation for the application is to be triggered.

4. The method of claim 1 wherein the information comprises a Data network Access Identifier (DNAI).

5. The method of claim 1 wherein the second network function is a session management function.

6. A method performed by a session management function managing packet data unit (PDU) sessions for a User Equipment (UE), the method comprising:
- establishing a first PDU session between the UE and a first User Plane Function (UPF);
- receiving a message originated from a domain name server (DNS) function, the message including information that triggers relocating the UE to a second UPF;
- establishing with the UE as a result of the relocating, a second PDU session anchored at the second UPF; and
- subsequent to the relocation, informing the DNS function to drop a DNS query that triggered the message, wherein the DNS query is received by the DNS function from the UE over the first PDU session.

7. The method of claim 6 wherein the information comprises a Data network Access Identifier (DNAI).

8. The method of claim 6 further comprising selecting the second UPF for the second PDU session.

9. The method of claim 6 further comprising releasing the first PDU session.

10. The method of claim 6 further comprising indicating to the UE, during the establishment of the second PDU session, the DNS function address to be used for subsequent DNS query over the second PDU session.

11. A node implementing a session management function, the node comprising one or more processing circuitry and one or more memory, the memory containing instructions executable by the one or more processing circuitry whereby the node is configured to:
- establish a first PDU session between a UE and a first User Plane Function (UPF);
- receive a trigger message originated from a domain name server (DNS) function, the message includes information that triggers relocating the UE to a second UPF;
- establish as a result of the relocation, a second PDU session with the UE to be anchored at the second UPF; and
- subsequent to the relocation, inform the DNS function to drop a DNS query from the UE that triggered the message wherein the DNS query is received by the DNS function from the UE over the first PDU session.

12. The node according to claim 11 wherein the information comprises a Data network Access Identifier (DNAI).

13. The node according to claim 11 further configured to select the second UPF for the second PDU session.

14. The node according to claim 11 further configured to release the first PDU session.

15. The node according to claim 11 further configured to indicate to the UE, during the establishment of the second PDU session, the DNS function address to be used for subsequent DNS query over the second PDU session.

* * * * *